H. R. KUEHNER.
BALL COCK.
APPLICATION FILED OCT. 17, 1918.
1,361,878.
Patented Dec. 14, 1920.
2 SHEETS—SHEET 1.
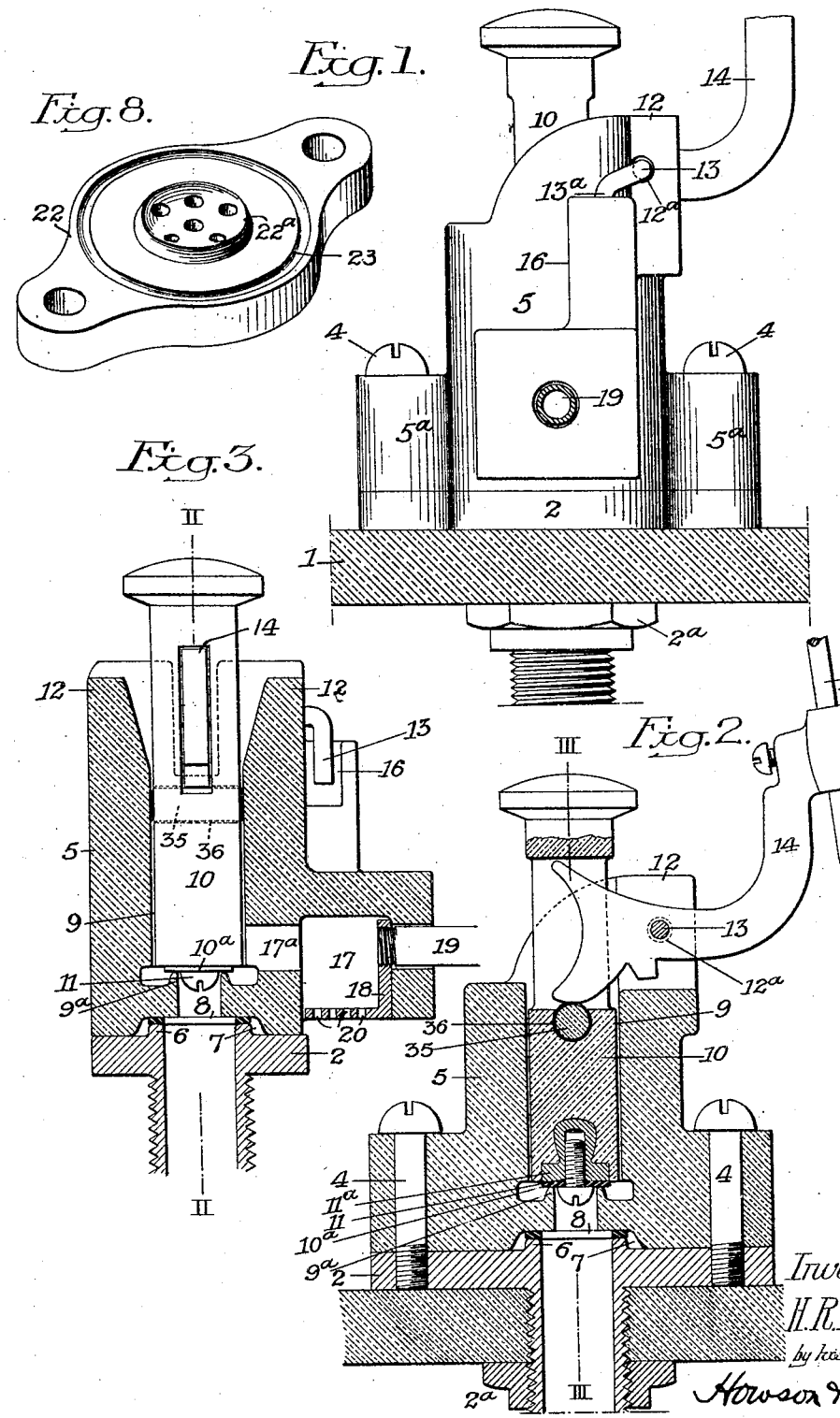
Inventor:
H. R. Kuehner,
by his Attorneys.
Howson & Howson

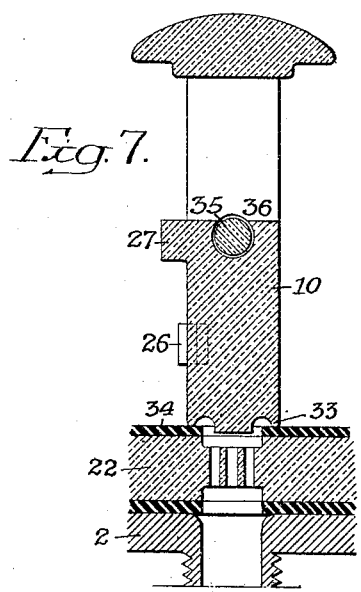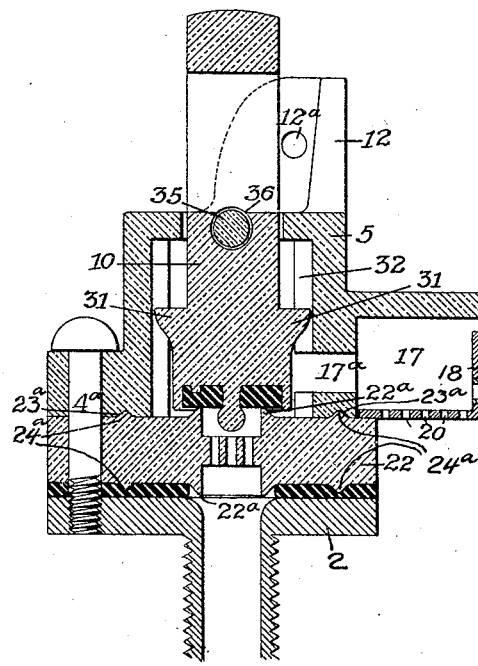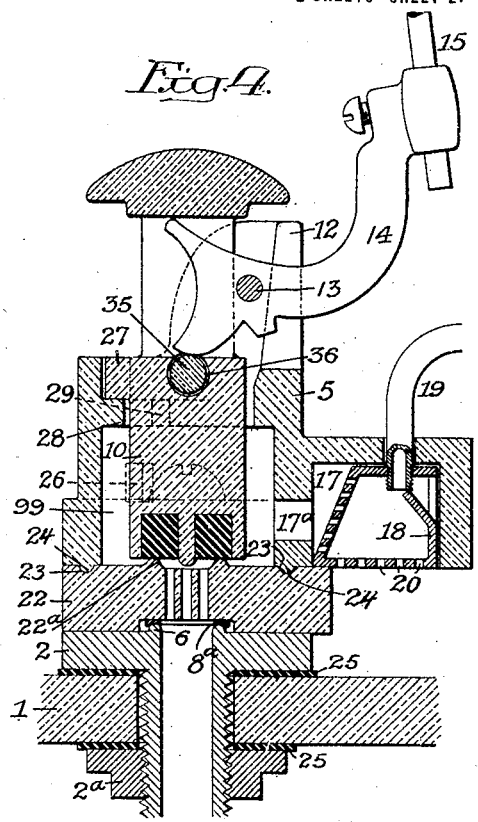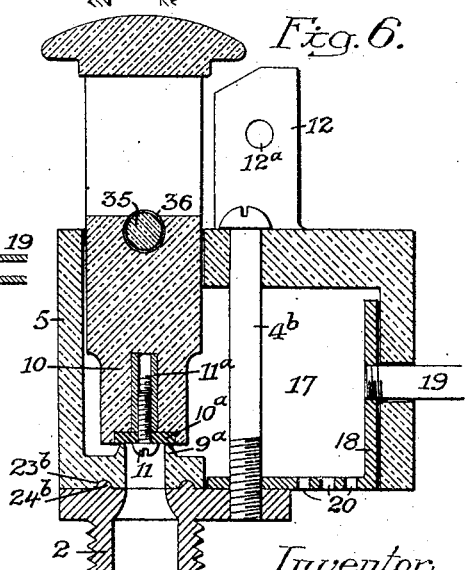

UNITED STATES PATENT OFFICE.

HERMAN R. KUEHNER, OF CAMDEN, NEW JERSEY.

BALL-COCK.

1,361,878.  Specification of Letters Patent.  Patented Dec. 14, 1920.

Application filed October 17, 1918. Serial No. 258,614.

*To all whom it may concern:*

Be it known that I, HERMAN R. KUEHNER, a citizen of the United States, residing in Camden, Camden county, New Jersey, have invented certain Improvements in Ball-Cocks, of which the following is a specification.

My invention relates to the ball-cock structures of flush tanks, employed for flushing water closets, urinals and the like; and the main object of my invention is to provide a structure made wholly of non-metallic parts with a view of obviating the deleterious effect which the waters of some localities have upon metal structures and fittings usually employed for this purpose.

To this end I propose to provide a structure in which the parts shall be of non-metallic material, and while there are many materials which might be employed for the purpose, I prefer to make the structures constituting my invention of some form of vitreous earthenware, such as china or porcelain, or in some instances of glass.

In assembling a structure so made, it may be necessary in some instances, and desirable in others, to employ other materials with the vitreous parts, and of course, it may be desirable or necessary to employ elastic gaskets between various parts of the structure to insure water-tight joints, all of which is within the scope of my invention.

These and other features of my invention are more fully described hereinafter, reference being had to the accompanying drawings, in which:

Figure 1, is a view in elevation, showing one form of valve structure within the scope of my invention, in position in a flush tank.

Fig. 2, is a sectional elevation of the same on the line II—II, Fig. 3.

Fig. 3, is a sectional elevation on the line III—III, Fig. 2.

Figs. 4, 5 and 6, are views similar to Fig. 2, illustrating modified constructions within the scope of my invention.

Fig. 7, is a sectional view illustrating a detail within the scope of my invention, and Fig. 8, is a perspective view of one of the parts which may be employed with the structures illustrated in Figs. 4 and 5.

In the accompanying drawings, 1 may represent the bottom wall of the flush tank with which my improved structure is employed, and such tank may be of any ordinary construction and made of any material. The bottom of the tank receives a metal fitting 2, which may be secured in place by a nut $2^a$, and to which the pipe for the inlet of water (not shown) is attached.

Mounted in line with this metal fitting and secured thereto by suitable means such as the screws 4, is the casing or body 5 of my improved valve structure; the same being preferably made of vitreous material, and the screws 4 pass through apertured bosses $5^a$ at the sides of the casing or body 5 and into the metal fitting 2. Between the metal fitting, which is preferably provided with a centrally disposed seat 6 and the lower portion of the body or casing 5 which may be recessed at 7, a washer 8 may be placed.

The valve casing is provided with a passage or chamber 9, having a seat $9^a$ near the lower portion of the same for engagement by a valve stem 10 vertically movable in said passage, and said valve stem is preferably made of vitreous material and provided with a gasket $10^a$ at its lower end for engagement with the seat $9^a$; such gasket being held in place by a screw 11 threaded into a lead filler occupying a recess in the end of said stem.

Projecting above the body of the valve structure are ears 12 which may be apertured at $12^a$ for the reception of a pin 13 upon which is pivotally mounted a lever 14 for operating the valve stem 10; such lever carrying the usual rod 15, to the opposite end of which may be attached the usual ball float (not shown). To avoid displacement of the pivot pin 13, the valve casing may be provided with an external pocket or recess 16 at one side to receive a projecting arm $13^a$ carried by said pin.

At one side of the valve body I provide a chamber 17 into which the inflowing water passes from the chamber 9 through a port $17^a$, and within this chamber I may place a baffle 18, preferably of metal, connected to an after-fill pipe 19. This baffle may be L-shape, and one wall is preferably perforated at 20, whereby the water may discharge into the tank; the sound of the inflow being materially reduced by the use of a perforated baffle.

In the structure illustrated in Fig. 4, I have shown a separate piece of vitreous material 22, carrying a valve seat $22^a$, which may be interposed between the valve body proper and the metal fitting 2. This piece 22 may be made of porcelain or other non-metallic material and in some instances it may be constructed to be reversible. For such purpose it may be provided with seats on both sides for engagement by the end of the valve stem 10, or the washer carried by the same.

The member 22 may be provided with annular ribs or projections or annular grooves for coöperative engagement with similarly shaped grooves or projections, as the case may be, on the under side of the valve body whereby said member may be properly positioned with reference to the same. Thus the member 22 shown in Fig. 4, and in the perspective view, Fig. 8, is provided with an annular groove 23 on its upper side for engagement with an annular rib or projection 24 on the under surface of the valve body. The under side of the member 22 may be similarly constructed if desired, but the form shown in Figs. 4 and 8 has a plain under surface and is not reversible.

In Fig. 5, however, I have shown a member 22 which is reversible, and this is provided on both surfaces with annular ribs or projections 24$^a$; that on one side being adapted to engage an annular groove 23$^a$ on the under surface of the valve body. In this arrangement, it is desirable to provide a gasket on the under side of the member 22, between the same and the metal fitting 2, to protect the ribs 24$^a$ of the same. As indicated, this form of the member 22 will be provided on its opposite faces with seats 22$^a$ for engagement by the gasket carried by the valve stem.

The opening through which water enters the valve casing through the piece 22 is preferably divided into a number of apertures so as to cut down or reduce the force of the entering water. The under side of the member 22 may be recessed in the same manner as the under side of the valve body shown in Fig. 2, with a washer 8$^a$ preferably interposed between the same and a seat carried by the metal fitting 2. If desired, sections 25 of sheet packing may be employed between the bottom wall of the tank and the metal fitting 2.

The valve stem employed with the form of structure shown in Fig. 4, is substantially like those shown in Figs. 1, 2 and 3. In addition it may be provided with lugs 26 and 27, which are designed to limit its movement in the valve body. For this purpose, the interior of the latter may be provided with an annular flange 28, having a notch 29, and the lug 26 of the valve stem is arranged to pass this shoulder through said notch 29, being then turned so as to bring its slotted portion in proper position for engagement by the operating lever 14. The other lug 27 of the valve stem may rest upon or lie above the shoulder or flange 28 when said stem is in the seated or closed position. This form of valve body may have an enlarged internal chamber 99, opening into a spray chamber 17 at the side substantially like that shown in Figs. 1, 2 and 3. The fitting 18 in this chamber is shown with two perforated walls.

In Fig. 5, I have shown another form of my improved structure, substantially like that shown in Fig. 4, in which the valve body is separate from the part carrying the seat for the valve, which may be a member 22, and in which the valve stem is arranged for sliding movement only in the valve body; having lugs 31 at the sides adapted to grooves 32 on the inner wall of said valve body. This structure is provided with a spray chamber of substantially the same type as those shown in the other structures illustrated. The parts of this form of my improved valve structure may be secured together by a single screw 4$^a$. In this form of the structure, the valve stem is passed into the body or casing of the valve from below. The interposed member 22 is reversible; being provided with seats 22$^a$ on both its upper and lower face, and having annular ribs or projections 23 for engagement with annular grooves 24 on the under face of the valve body. A gasket may be interposed between the same and the metal fitting 2.

In the structure shown in Fig. 6, the delivery chamber 17 may communicate directly with the chamber 9 and the valve body may be secured to the metal fitting by a single screw 4$^b$. The valve body carries the seat for the valve stem which may be provided with the usual washer, and the metal fitting may have an annular rib or projection 24$^b$ adapted to engage an annular groove 23$^b$ on the under side of the valve body whereby the latter may be positioned with respect thereto. The operation of this valve structure is substantially like those illustrated in the other views.

In Fig. 7, I have shown another arrangement in which a valve stem of substantially the same character as that illustrated in Fig. 4, is employed, but instead of carrying a washer at the lower end of the same, such end is shaped to form a seat 33 which may be adapted to engage a gasket, or sheet packing 34 interposed between the same and the bottom of the valve structure, or an interposed member 22 of the general type shown in Figs. 4 and 5, and which may be reversible. This valve stem may have the lugs shown on the form of valve stem illustrated in Fig. 4.

To facilitate operation of the valve stem by the lever, such valve stem may be provided with a roller 35, adapted to a cross aperture 36 forming a seat or journal in the body of the stem; which roller is preferably of porcelain and with which the end of the lever engages.

The interposed member 22 may be of any suitable construction, and when employed forms the bottom of the valve body or casing 5. As shown in Fig. 4 it has a valve seat on its upper side and an annular groove concentric to the same to receive an annular rib carried by the valve body; the under side being centrally recessed, and a number of relatively small apertures being provided for the passage of water. In the form of structure shown in Fig. 5, the plate is provided with annular ribs concentric with the annular valve seats; both faces of the member being of the same character. It will be understood, of course, that while it is preferable to provide the same with valve seats, it may have an annular groove or an annular rib surrounding the said valve seat, as may be desired, for coöperative engagement with an annular rib or an annular groove in the under side of the valve body; either arrangement being within the scope of my invention.

While I have set forth certain specific embodiments of my invention and have shown my improvements as embodying certain definite details of construction, it will be understood that I do not wish to be limited to the precise constructions shown and that the following claims are designed to cover my invention as illustrated and described as well as any equivalent construction embodying the use of non-metallic material, vitreous or otherwise, employed for a similar or equivalent purpose.

I claim:

1. A ball-cock valve-structure having an integral, hollow non-metallic body, a metal fitting, a non-metallic member interposed between said body and the metal fitting and having a valve seat substantially axially disposed with respect to said hollow body, means for securing said body, metal fitting and interposed member together, a non-metallic valve stem operable within said hollow valve body, and a gasket carried by said stem and adapted to engage the seat of said interposed member.

2. A ball-cock valve-structure having an integral, hollow body of vitreous material, a metal fitting, a vitreous member interposed between said body and the metal fitting and having a valve seat substantially axially disposed with respect to said hollow body, means for securing said body, interposed member and metal fitting together, a valve stem of vitreous material operable within said body, and a gasket carried by said stem and adapted to engage the seat of said interposed member.

3. A ball-cock structure having a porcelain body, a metal fitting, a porcelain member interposed between said body and the metal fitting and having a valve seat, a porcelain valve stem, an elastic gasket carried by said stem for engagement with said seat, and means for securing said parts together.

4. A ball-cock valve-structure having an integral, hollow body of vitreous material, a metal fitting, a vitreous member interposed between said body and the metal fitting and having a valve seat substantially axially disposed with respect to said hollow body, a porcelain valve stem, an elastic gasket carried by said stem and adapted to engage said seat, a side extension carried by the valve body integral therewith and having a chamber with an open bottom, an outlet leading from the internal chamber of said valve body to the outer chamber, and a perforated baffle mounted in said latter chamber.

5. In combination with a flush tank, a ball-cock valve-structure comprising an integral, hollow body of vitreous material, a member of vitreous material interposed between said body and the tank and having a valve seat substantially axially disposed with respect to said hollow body, a valve stem of vitreous material mounted for vertical movement within said body, means for moving said valve stem, and an elastic washer carried by said valve stem for engagement with the seat of said interposed member.

6. A ball-cock valve-structure having an integral, hollow body of vitreous material with an internal chamber, a metal fitting, a member of vitreous material interposed between said valve body and the metal fitting and having a valve seat, a porcelain valve stem, an elastic gasket carried by said stem and adapted to engage said seat; said interposed member having a water inlet, a side extension carried by the valve body integral therewith and having a chamber with an open bottom; the wall of the valve body having a passage affording communication between the interior chamber thereof and the chamber of said side extension, and a perforated baffle mounted in said latter chamber.

7. In combination with a flush tank, a ball-cock valve-structure comprising a body of vitreous material, a reversible member of vitreous material between said body and the tank and having valve seats, a valve stem of vitreous material within the body and adapted to engage one of said seats, an elastic washer carried by said valve for engagement with said seat, and a rib and groove connection between said body and the reversible member; one of said parts having an annular rib adapted to fit an annular groove in the other.

8. In a ball-cock valve-structure, a vitreous body, a valve stem of vitreous material, a lever for operating the same, a pin having a bent end pivotally connecting the lever with the body, and a pocket carried by the body for receiving the bent end of said pin.

9. A ball-cock valve-structure having an integral, hollow body of non-metallic material, a metal fitting, a vitreous member interposed between said body and the metal fitting and having a valve seat substantially axially disposed with respect to said hollow body, a non-metallic valve operable within said body and adapted to engage said seat, an integral side extension carried by the valve body and having a chamber with an open bottom; the wall of the valve body having a passage affording communication between the interior chamber thereof and the chamber of said extension, and a perforated detachable spray plate forming a baffle mounted in said latter chamber.

10. A ball-cock valve-structure having a body of vitreous material, a metal fitting, a vitreous member interposed between said body and the metal fitting and having a valve seat, and a valve of vitreous material operable within said body and adapted to engage said seat; said interposed member having a plurality of inlet passages within the space defined by the valve seat.

H. R. KUEHNER.